United States Patent [19]

Takacs et al.

[11] 4,296,072
[45] Oct. 20, 1981

[54] APPARATUS FOR THE TREATMENT OF WET SOLIDS, ESPECIALLY PULPY MATERIALS, BY HEATING OR COOLING

[75] Inventors: István Takács; Zoltán Bános; János Illés; Endre Vereczkey; Péter Rudolf; György Kerey, all of Budapest, Hungary

[73] Assignee: Richter Gedeon Vegyészeti Gyár, Budapest, Hungary

[21] Appl. No.: 131,825

[22] Filed: Mar. 19, 1980

[30] Foreign Application Priority Data

Mar. 21, 1979 [HU] Hungary ............................ RI 702

[51] Int. Cl.³ .................. B01D 1/14; B01D 9/02; B01D 9/04; B01D 11/00
[52] U.S. Cl. ........................... 422/254; 34/92; 34/129; 34/133; 34/137; 62/441; 159/23; 159/29; 159/DIG. 16; 366/25; 366/224; 422/271; 422/273; 422/287; 422/289; 422/290; 422/308; 422/309; 432/112; 432/117; 432/118
[58] Field of Search ............... 422/245, 254, 202, 198, 422/286–290, 307–309, 209, 210, 273, 271, 288; 34/92, 129, 133, 137, 141, 142; 159/1 RW, 17 C, 23, 29, DIG.5, DIG. 16; 99/447, 49 S; 62/441; 432/112, 117, 118; 366/22, 25, 224

[56] References Cited

U.S. PATENT DOCUMENTS

| | | | |
|---|---|---|---|
| 590,287 | 9/1897 | Webster | 366/224 |
| 1,649,839 | 11/1927 | Marston | 34/137 |
| 2,100,444 | 11/1937 | Lavett | 34/141 |
| 2,694,565 | 11/1954 | Sainderichin | 432/118 |
| 3,251,214 | 8/1973 | Wenzel et al. | 432/112 |
| 3,362,688 | 1/1968 | Fischer | 366/233 |
| 3,381,944 | 5/1968 | Clary | 366/220 |
| 3,388,893 | 6/1968 | Hall | 34/129 |
| 3,440,674 | 4/1969 | Carver et al. | 34/137 |
| 3,645,699 | 2/1972 | Brodie | 422/245 |
| 3,889,391 | 6/1975 | Malcolm | 34/141 |

*Primary Examiner*—Bradley Garris
*Attorney, Agent, or Firm*—Karl F. Ross

[57] ABSTRACT

Apparatus for the treatment, such as drying, freezing, crystallization of wet solids, slurries, suspensions, pulps and similar materials with heating or cooling.

The apparatus is characterized by a treating body having two sections. The first section has a horizontally arranged axially flared annular treating drum rotatable around the horizontal or near-horizontal longitudinal rotation axis, and having end plates with a material feeding inlet pipe leading into the interior through one end plate, while the other end plate is provided with an opening arranged eccentrically in relation to the rotation axis. The second section of the treating body is connected rigidly and thus rotatably to the treating drum, the second section of the treating body having at least three duct-like oblong treating members leading into each other. The longitudinal axes of the treating members together form a zig-zag or similar line, and they intersect the rotation axis of the treating drum—which is the common axis of rotation of the treating drum and of the part forming the second section of the treating body and consisting of the treating members outside the treating drum.

10 Claims, 8 Drawing Figures

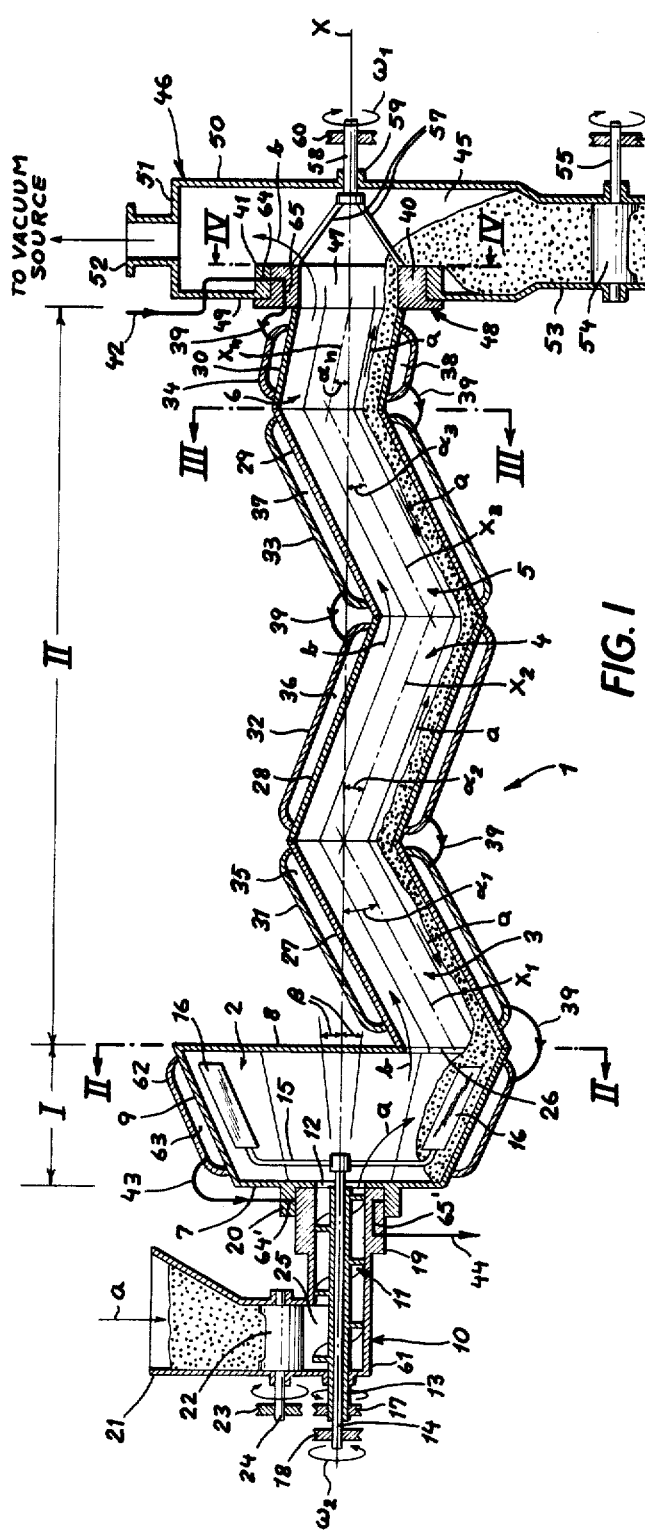
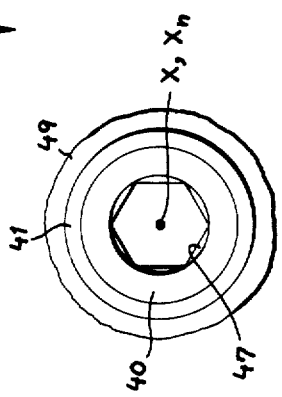
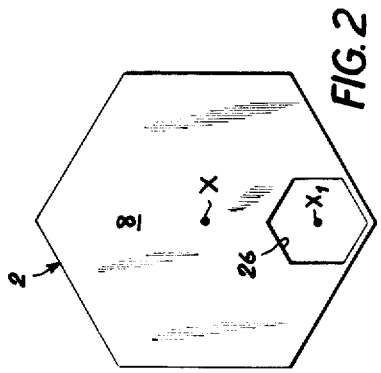

APPARATUS FOR THE TREATMENT OF WET SOLIDS, ESPECIALLY PULPY MATERIALS, BY HEATING OR COOLING

FIELD OF THE INVENTION

The invention relates to an apparatus for the treatment of wet solids, pulpy and similar materials by heating or cooling. The treatment of such materials includes the processes related to the reduction of moisture content, dewatering (drying), extraction of solids from solutions; freezing of lumpy, soft materials, crystallization, etc.

BACKGROUND OF THE INVENTION

For the drying of lumpy solid materials wetted with solvents, horizontally or near-horizontally arranged externally heated cylindrical apparatus with double walls is used (J. H. Perry: Chemical Engineers' Handbook, page 1712). The solvent is removed from the solid material by a vacuum suction during the drying process and is discharged from the upper part of the equipment. The rotary drum-type vacuum drying apparatus is of intermittent operation, and its filling and draining are cumbersome. Its applicability is limited, since it can be used only for the drying of round, non-sticky, lumpy materials. The material may adhere to the inner surface of the cylinder, an anti-heat conductive layer may occur, and thus the heat utilization is relatively unfavorable. Rotation of the drum with the lumpy material to be dried requires relatively high power consumption.

For the purpose of extracting the solvent remaining in the solid material after the extraction of animal organs and ground plants with solvent, evaporator-type solvent extracting devices are used. Such an apparatus is described for instance in the journal titled: "Paper of Pharm." (USSR, page 27–30/1966/). The solid material containing the solvent is continuously pulped with hot water and the obtained pulp is delivered into the uppermost cylinder of double-walled, heatable, horizontal twin cylinders arranged one above the other.

The solids free of solvents pass out of the bottom cylinder. The extracted solvents pass out of the upper part of each cylinder. The interiors of the cylinders are each provided with a rotary screw conveyor for the purpose of improving the heat transfer, and for the longitudinal delivery of the solids simultaneously with mixing. The heat transfer takes place through the wall and/or with steam conducted into the suspended solid material. A disadvantage of this apparatus—among others—is the high risk of breakdown of the screw conveyor, since the granulated plants may contain brittle, lumpy material (e.g. stones, pieces of metal) which may lead to stopping the screw conveyor or to breakage of the drive by getting jammed between the screw and the wall. Rotation of the screw requires high power consumption. The value of heat transfer and heat utilization is low.

The grading screw type cooling crystallizer described in "Dr. Mucsai L.: Kristályosítás" (Crystallization), Müszaki Könyvkiadó, Budapest, 1971, page 151, is known as a crystallizer apparatus. The grader of the grading screw type cooling crystallizer is provided with a sloping trough-shaped bottom, on the lower part of which the larger crystals are deposited. These are removed from the trough by the screw. The mother liquor flowing out of the grader flows back into the mother liquor tank together with the smaller crystals, from where it passes into the cooling system. The disadvantage of this process is that the method of grading of two fractions—i.e. to the material removed with the screw and returned with the mother liquor—is cumbersome, since the grading is regulated by the rate of the flowing medium, while at the same time the crystallization process is a function of the flow rate.

Freezing of the lumpy materials of soft consistency (e.g. meat industry small animal organs, soft fruits, etc.) is often necessary in the food industry. At the present time, freezing tunnels or fluidization freezers are used for the purpose. In the former, the movement of the material from the input to the output takes place with a specially formed belt, and the heat extraction for the freezing takes place with cold air flowing above the material; while in the latter, the cold air passes through the mass of solids, the material being moved during the process of freezing, whereby the rate of cooling is increased.

OBJECTS OF THE INVENTION

The invention is aimed at providing a structurally simple apparatus, with the aid of which the heating or cooling treatment of wet solids, pulpy and similar materials can be accomplished in a continuous operation, well adaptable to varying operating conditions. The most essential objects of the invention are the following:

vacuum drying of solids wetted with solvents, extraction of the solvents as a result of which the solvent and/or solids suitable for further processing or utilization as waste material may be obtained;

preliminary dewatering of slaughterhouse wastage, as a result of which sterilized solids are obtained;

recovery of dissolved solids in crystalline form by cooling or heating;

deep freezing of soft, lumpy materials.

SUMMARY OF THE INVENTION

The invention is based on the recognition that if the equipment has a horizontally or near-horizontally rotatable closed drum divided into two sections in such a way that the first section is formed by a truncated cone or truncated pyramid, while the second section is composed of polygonal prismatic parts eccentrically interconnected along a serrated (sawtooth) line, and the simultaneous heating with/or cooling of the equipment, or putting it under vacuum—then the dwelling period of the material in the treating space will be considerably extended and the material will be in a continuous and very intensive forward-backward movement while passing from the point of entry to the point of discharge, as a result of which the heat transfer surface is constantly regenerated and the treated material receives the heat or cold intensively over the largest possible surface. This way, effective drying can be achieved with a heating medium of relatively low temperature.

On the basis of this recognition, the objectives according to the invention are attained by an apparatus which is provided with a treating body, having a device to admit the material to be treated into the treating body, a device to discharge the treated material from the treating body and a device admitting the heating or cooling medium to the external surfaces of the treating body. The treating body comprises two sections, the first of which has a horizontally or near-horizontally arranged treating drum shaped as a truncated cone or truncated pyramid centered on and about a horizontal rotatable longitudinal axis, the side walls and end plates of the drum being made of an impervious material, preferably sheet metal, with a pipe feeding the material into the interior through the smaller end plate. The larger end plate has an opening eccentrically arranged to the horizontal axis, this opening communicating with the second section of the treating body, which is rigid with the drum and has at least three duct-like oblong treating members leading into each other, the side walls of which are made of an impervious material, preferably plate metal, the longitudinal geometrical axes of the treating members forming zig-zag or similar lines with each other and intersect the horizontal axis of the treating drum, which is the common axis of rotation of the treating drum and the treating body-part consisting of the treating members and forming the second section of the treating body. According to another feature of the invention, the device which delivers the heating or cooling medium to the external surfaces of the treating body is formed by enclosed spaces defining jackets arranged over the external surfaces of the treating drum and treating members in a manner permitting the passage of the heating or cooling medium therethrough by being interconnected, for instance by pipes, a heating or cooling medium inlet pipe leading into at least one of the closed spaces, and a pipe for the discharge of the heating or cooling medium, e.g. condensate having an outlet also from at least one of the enclosed spaces. According to another feature of the invention the device for applying the heating or cooling medium to the external surfaces of the treating body is formed by a closed, preferably horizontally arranged cylindrical tank, containing the heating or cooling medium, preferably steam or coolant, in which the treating body is rotatably mounted in a manner so as to prevent the cooling medium from entering the interior of the treating body. In another embodiment, the heating or cooling effect is increased by using a device in the apparatus which ensures the passage of a gaseous heating or cooling medium through the interior of the treating body in a direction counter to the flow of the treated material.

Another preferable embodiment of the apparatus according to the invention is characterized by having a vacuum generating device connected to the interior thereof, and gastight cell feeders built into the interior of the treating body to admit the material to be treated and discharged from the treating body without loss of vacuum.

The cross section of the oblong duct-like treating members may be polygonal, e.g. hexagonal, but members of circular cross section may also be used. According to a further invention criterion the apparatus has means for delivering the heating or cooling medium at different temperatures to the enclosed space surrounding the treating drum and/or the treating members.

The fields of application of the apparatus and the advantages offered by the invention are summed up as follows:

The continuous drying of heat-sensitive, lumpy granular materials of low moisture content wetted with solvents which, due to their large heat transfer surfaces and their favorable heat efficiency, can be realized at low temperature, the solvent being extracted and used again without polluting the environment. Since the drying space of the treating body is completely closed, the risk of dust formation is eliminated and no dust filter is necessary.

The apparatus can be applied to advantage also for evaporation, for instance in cases when during the extraction of a compound consisting of solid and liquid (solvent) phases, considerable quantity of solvent remains in the extracted solid or granular material (e.g. animal organs, medicinal herbs) which must be extracted from the solids for reasons of economy and/or environmental protection. This task of solvent extraction is feasible with the apparatus according to the invention, in a vacuum in a continuous process. The operation offers the following main advantages:

there is no water consumption since no water vapor distillation takes place;

after the extraction of the solvent the solid material is dry and can be utilized without any special further treatment, nor it is passed into the public sewer system to cause pollution;

the amount of steam required for external heating is approximately half of that required for the known evaporation processes, since heat transfer surfaces and the heat transfer coefficient is substantially higher than usual;

the cooling water consumption is lower, a maximum of half of what is required for the known processes serving similar purposes, since among other things, there is no need to condense the water vapor swept away by the solvent vapors;

the electric power consumption is likewise substantially lower, approximately one third of what is needed for the known processes serving the same purpose, which require considerable energy input to transmit the suspension and the solids in the evaporators;

there is no need to reduce the drug to pulp and then dewater and dry it in a separate apparatus.

As a result of the aforementioned factors, the specific space requirement, the investment and running costs of the apparatus according to the invention are substantially lower than in the usual practice.

The apparatus according to the invention is capable of preliminary dewatering by cooking of material of various consistency, e.g. slaughterhouse and other by-products, and of the partial dewatering of solids in a very favorable manner. For this purpose it is preferable to reduce the material to pulpy consistency by appropriate pretreatment.

The advantages offered by the application of the apparatus for cooking are found primarily in the already mentioned large heat transfer surfaces and favorable heat efficiency; the apparatus is structurally simple, its space requirement is small and the material does not adhere to the walls, the apparatus being easy to clean and its investment and running costs are more favorable than those of the known devices serving the same purpose.

The apparatus according to the invention is applicable in the food industry, for instance for the economical freezing of lumpy soft materials, such as soft fruits or animal organs. The favorable heat transfer coefficient, the ease of cleaning and the fact that, due to the gentle handling, even sensitive, soft fruits can be frozen without getting damaged and, due to the forward-backward sliding movement, the absence of sedimentation or adherence to the walls represent considerable advantages.

The apparatus according to the invention is suitable also for the economical realization of crystallization processes, such as the continuous production of supersaturated solutions by cooling or heating and partial crystal growth. Due to the gentle material handling the crystals are neither crushed nor do they stick together; there is no sedimentation in the equipment, since the crystal, or crystal slurry being in a forward-backward, sliding movement, makes the surface accessible; due to the constant movement, no supersaturation of the parent phase takes place in the vicinity of the cooling surface, consequently there is no need to reckon with crystallization of the cooling surface; and finally by mixing the parent phase, the heat transfer coefficient also assumes a more favorable value.

Using the apparatus according to the invention for any of the tasks described above, its favorable specific heat transfer factor, the completely closed continuous process, the high safety of operation, elimination of the environmental problems, the satisfaction of the hygienic criteria and finally the low investment and running costs represent considerable advantages.

BRIEF DESCRIPTION OF THE DRAWING

The above and other objects, features and advantages of the invention will become more readily apparent from the following description, reference being made to the accompanying drawing, in which:

FIG. 1 is a diagrammatic axial sectional view of the apparatus according to the invention;

FIG. 2 is a diagrammatic sectional view taken along II—II of FIG. 1;

FIG. 3 is a diagrammatic sectional view taken along line III—III of FIG. 1;

FIG. 4 is a diagrammatic sectional view taken along line IV—IV of FIG. 1;

SPECIFIC DESCRIPTION

Figure 5:
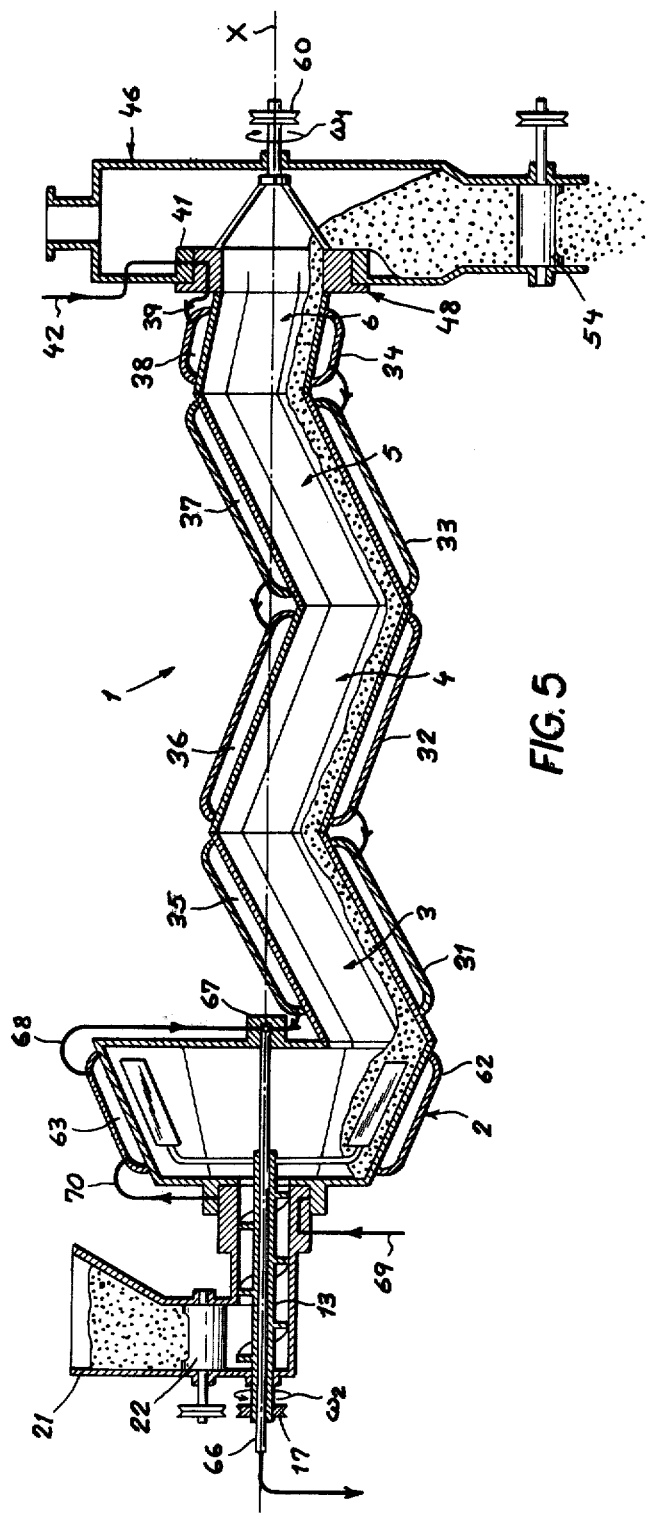
FIG. 5 is a diagrammatic axial sectional view of the apparatus according to another embodiment of the invention.

As shown in FIGS. 1-4, the apparatus according to the invention has a treating body 1, consisting of two consecutive sections. The first section I is formed by a horizontally arranged annular treating drum 2, centered on a horizontal axis X and having an axially flared peripheral wall 9, the second section II having four treating members 3, 4, 5 and 6. The treating members are oblong hollow bodies of regular hexagonal cross section, their walls being solid (non-perforated) plate metal. The treating drum 2, which has a regular hexagonal cross section in this embodiment and the treating members 3, 4, 5 and 6 are rigidly interconnected and lie on the common horizontal axis of rotation X, marked with a dash and dot line in FIG. 1, which is at the same time the central and rotational axis of the horizontally arranged treating drum 2, i.e. the common horizontal longitudinal axis of rotation of the complete treating body 1.

The peripheral wall 9 polygonal and end plates 7, 8 of the treating drum 2 are similarly made of solid (non-perforated) plate metal; the annular end plates 7, 8 are vertically arranged. In the central range of the smaller end plate 7 a circular opening 12 is provided through which a screw conveyor 11 of a material feeding device 10 leads into the interior of the treating drum 2, the screw conveyor being carried on a hollow shaft 13. Through the hollow shaft 13 a rotating shaft 14 extends into the treating drum 2. Arms 15 are fitted to the extended end of shaft 14. Mixing blades 16 are attached to the tips of arms 15 running in the vicinity and parallel to the internal surface of wall 9. The mixing blades 16 rotate in the direction of arrow $\omega_2$ which also represents the angular velocity. The mixing blades 16 rotate counter to the rotation $\omega_1$ of the treating body 1 and their angular velocities are likewise different. A drive 17 rotates the hollow shaft 13 of the screw conveyor 11, while a drive 18 rotates the shaft 14.

The screw conveyor 11 has a horizontally arranged tubular housing 61 to which a bearing 19 is rigidly fixed, with a rotary bearing 20 mounted on it externally. Bearing 20 is rigidly connected to the end plate 7 of the treating drum 2, thus they can be rotated in unison.

A hopper 21 admitting and feeding the material to be treated, leads into the worm housing 61 through opening 25. An airtight cell feeder 22 is arranged above the opening 25 on a shaft 24 to which a drive 23 is attached. With cell feeder 22 and screw conveyor 11 wet solids, pasty material, solutions or similar materials can be fed into the treating drum 2.

In the larger annular end plate 8 of the truncated drum 2—i.e. in the plate opposite the inlet opening 12—a regular hexagonal opening 26 is formed offset from the longitudinal axis X in such a way that opposite apexes of the regular hexagon lie on a line extending to the axis X from an apex of the end plate 8 (see FIG. 2). The cross sectional area of the opening 26 should not be larger than a maximum of one half of the cross sectional area of end plate 8.

The walls 27, 28, 29 and 30 of the prismatic treating members 3, 4, 5 and 6 constituting the second section II, are formed by solid (non-perforated) flat plates connected to each other in an airtight manner. Each treating member 3, 4, 5 and 6 is separately provided with jackets, 31,32, 33, and 34 which form enclosed spaces 35, 36, 37 and 38 with the walls 27, 28, 29 and 30. Also the wall 9 of the treating drum 2 is provided with a jacket 62 forming an enclosed space 63 with the wall. The adjacent enclosed spaces 63, 35, 36, 37 and 38 are interconnected by bent pipes 39 and can be filled with a heating or cooling medium, or condensate through an inlet pipe 42, the medium passing through the interconnected jackets to the discharge pipes 43 and 44. The material admitted into the treating drum 2, and into treating members 3, 4, 5 and 6 is heated or cooled to the required temperature by thermal conduction through the jacketed walls.

The last treating member 6 of the second section II of the treating body 1 ends at a ring 48, centered on the axis X, the opening 47 of which leads into a discharge space 45 of a discharge box 46. The ring 48 is formed by bearing 40 rotating together with the treating body 1. The rotary bearing 40 is carried by another stationary bearing 41 rigidly attached to the side wall 49 of the discharge box 46. The opening 47—as clearly shown in FIGS. 3 and 4—changes its cross section from polygonal to circular.

The inlet pipe 42 opens into a passageway 64 of the circular bearing 41, the passageway being connected with another passageway 65 of bearing 40. The duct 64 in bearing 41 may be a radial bore, while the passageway 65 in bearing 40 may be an axial bore. When during the rotation of the bearing 40 the two coincide, the path of the heating or cooling medium becomes open toward the bent pipe 39 opening into the closed space 38. Similar passageways 64′, 65′ are formed also in bearings 20 and 19 at the screw conveyor 11. This allows the eventual emission of the heating or cooling medium from the jacket 62 of the treating drum 2.

If necessary, another embodiment of the invention (not shown) may be applied for supplying the enclosed spaces 35, 36, 37, 38 with heating or cooling medium, whereby separate feeder pipes rotating together with the treating body 1 are connected to each closed space, admitting heating or cooling medium of varying temperatures into the various enclosed spaces, the temperature of the treating drum 2 and the treating members 3, 4, 5 and 6 being set to optimum value according to the materials being treated.

The discharge box 46 has another side wall 50 also vertically arranged and parallel with the side wall 49 already mentioned. The discharge space 45 between the side walls 49 and 50 is closed by cover 51, from which pipe stub 52 emerges above the longitudinal axis of rotation X. Discharge chute 53 is connected to the discharge space 45 and contains an airtight cell feeder 54. The shaft 55 of the cell feeder 54 is carried by a bearing in the wall of chute 53 and is connected to drive 56. The pipe stub 52 is connected to a vacuum source and serves for the removal of the vapors (steam) released during the processes taking place in the treating body and to create a vacuum therein, while through the lower chute 53, the solids (e.g. crystal slurry) are discharged.

In the rear end wall 50 of the discharge box 46 a bearing 59 is centrally arranged to support a shaft 58. The inner end of the so supported shaft 58 extending into the discharge space 45, is rigidly fixed to the bearing 40 via a linkage consisting of the bars 57 marked with dotted lines, while its other outer end is connected to a drive 60—i.e. by rotation of shaft 58 the whole treating body 1 can be rotated. The direction of rotation and the angular velocity $\omega_1$ of the rotation are marked with arrows. The shaft 58 is centered on the longitudinal axis of rotation X.

The first prismatic treating member 3 of the second section II of the treating body 1 is connected to opening 26 of the treating drum 2 in such a way, that its longitudinal geometrical axis $X_1$ is at an angle of $\alpha_1$ to the horizontal, and intersects the common horizontal axis of rotation X outside the treating drum 2. The longitudinal axis $x_2$ of the next prismatic treating member 4 is at an angle of $\alpha_2$ to the horizontal, the longitudinal axis $x_3$ of the third prismatic treating member 5 is at an angle of $\alpha_3$ to the horizontal and finally the longitudinal axis $x_n$ of the last prismatic member 6 is at an angle of $\alpha_n$ to the horizontal, so that the longitudinal axes $X_1$-$X_n$ together form a zig-zag or similar line, thus also the axes $X_2$, $X_3$, $X_n$ intersect the longitudinal axis of rotation X outside the treating drum 2. Accordingly the prismatic treating members 3, 4, 5, and 6 are engaged in a sawtooth configuration and have a common interior space.

The internal surface of the truncated treating drum 2 and the internal surfaces of the treating members 3, 4, 5 and 6 which are in direct contact with the treated material are made of such structural materials which prevents the treated material from adhering to the surfaces; for this purpose a teflon lining may be used.

The cells 22 and 54 are formed in such a way as to maintain a vacuum applied to the interior of the apparatus during rotation, feeding and discharge. Since the device for generating the vacuum and its connections are conventional, they are not fully illustrated.

The treating members 3, 4, 5 and 6 and the treating drum 2 can be pivotally displaced in a vertical plane through a small angle $\beta$ upwardly and downwardly from the normally horizontal longitudinal axis of rotation X by a built-in device, not shown in the drawing.

Operation of the apparatus according to FIGS. 1–4 is described in connection with the continuous drying in a vacuum of lumpy granular, solids of low moisture content wetted with solvent.

By activating the drives 17, 18, 23, 56 and 60, the cell feeders and screw conveyor are brought into operation and the treating body 1 as a whole is rotated and a vacuum is generated in its interior. The solvent, for instance a vegetable drug containing bensol is admitted from the direction of arrow a into the hopper 21 and carried to the treating drum 2 with the aid of cell feeder 22 and screw conveyor 11. The heating medium, for instance steam is admitted into the enclosed spaces 38, 37, 36, 35 and 63 via the feeder pipe 42 and the temperatures are set in such a manner, that the drug in the first section I is heated to approximately 80° C. The counter rotation of the treating drum 2 and the mixer blades 16 results in the intensive and continuous mixing of the heat treated material so that a major part of the solvent-containing vapors separate from the solids in the first section I, the solids being discharged by the rotary treating drum 2 at a continuous rate into the first prismatic treating member 3 of the second section II. The discharged material is kept at a temperature of 80° C. even in the second section II. As a result of the rotation at an angular velocity of $\omega_1$, the material moves forward and backward in the second section II, being in constant intensive contact with the heated surface, cleaning it automatically and thereby keeping the effective heat transfer at an optimum level. In the second section II, the material dwells for about 15 to 20 minutes during which time its solvent content is expelled.

The progress of the solids in the treating body 1 is indicated by the arrows a, the flow of the vapors by arrows b: as seen in the right hand side of FIG. 1 the solvent-extracted solids pass downward via the extension 53 while the steam goes upwards, leaving via pipe stub 52. After this latter condensation the steam may be re-used and also the solvent-free drug now practically 100% solids can be similarly utilized.

Another embodiment of the apparatus according to the invention, as shown in FIG. 5, differs from those shown in FIGS. 1–4 only in that the temperature of the treating drum 2 constituting the first section I can be set to a value different from that of the treating members 3, 4, 5 and 6 of the second section II. Namely the heating or cooling medium the temperature of which may be different from that of the heating or cooling medium admitted into the enclosed spaces 38, 37, 36, 35 of respective jackets 34, 33, 32 and 31 via the inlet pipe 42, is also delivered into the enclosed space 63 of jacket 62 surrounding the treating drum 2, through another inlet pipe 69, the passageways 64′ and 64′ of bearings 19 and 20, and feeder pipe 70. In this embodiment there is an outlet pipe 66 in the hollow shaft 13, through extending and beyond the treating drum 2, the pipe end embedded in bearing 67 which rotates around pipe 66 and has a passageway communicating therewith and with the enclosed space 63 surrounding the treating drum 2 by pipe 68. The heating or cooling medium (e.g. condensate) leaving the enclosed space 63 reaches the rotary bearing 67 via the pipe 68 and passes through the passageway of the latter and into outlet pipe 66. From the enclosed space 35 surrounding the treating member 3, directly connected to the treating drum 2 in the second section II, a pipe is branched off and also connected to the outlet pipe 66. In this arrangement the heating or cooling medium (e.g. condensate) used in the second section II can also be discharged through pipe 66. Otherwise the apparatus illustrated in FIG. 5 is the same as that in FIG. 1, therefore the identical structural parts were marked with the same reference numbers.

Figure 6:
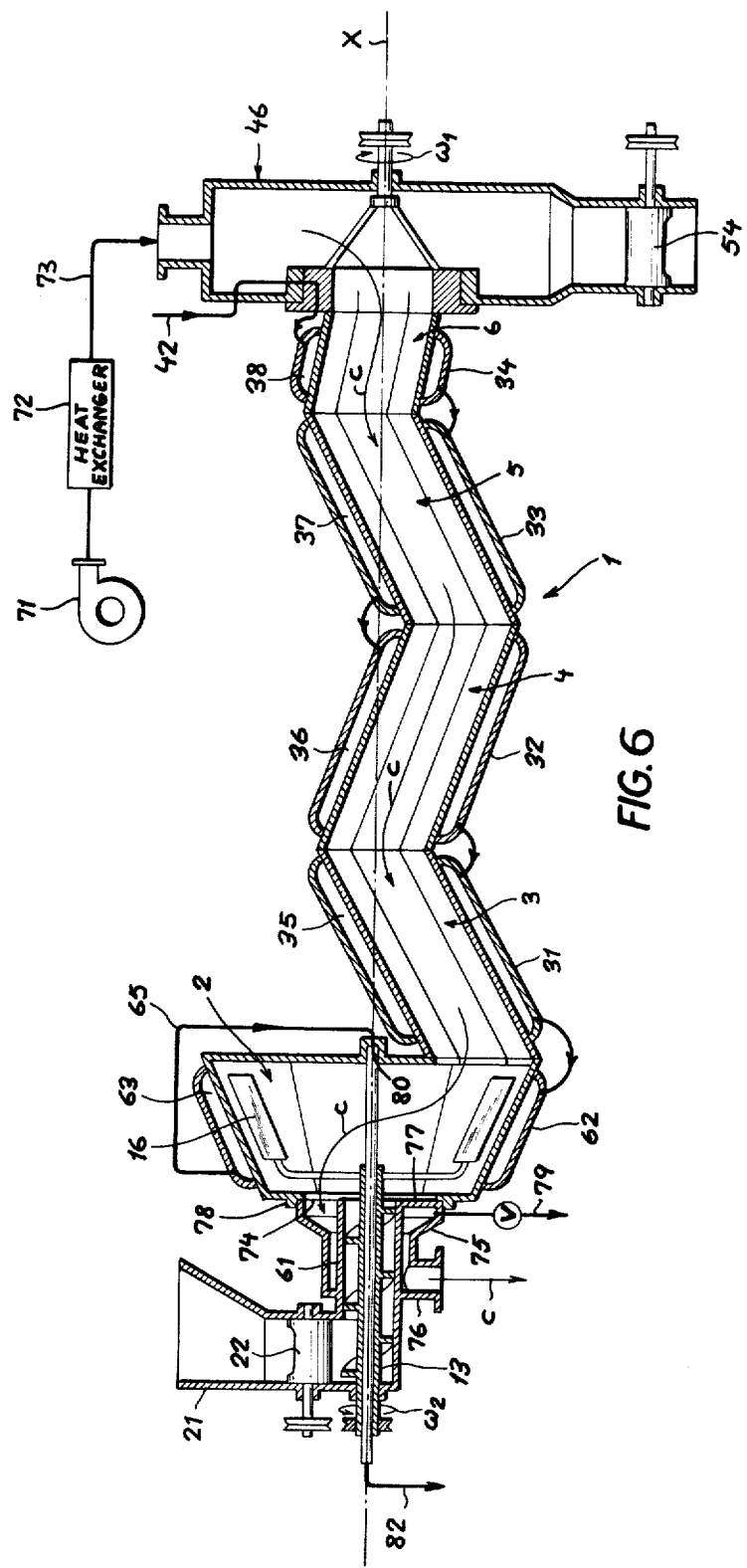
FIG. 6 is a diagrammatic axial sectional view of the apparatus according to still another embodiment of the invention.

The apparatus shown in FIG. 6 is different from that shown in FIG. 1, partly because in it, the discharge of the used cooling or heating medium is not effected through the bearings, and partly because the bearings can be heated or cooled also by air flowing counter to the flow of material in the treating body 1. In the given case, air is delivered by the blower 71 which drives the air drawn through the cooler 72 to the discharge space 45 via pipe 73. Here the cold air is admitted into the second section II flowing along in the direction shown by arrows c, then through the opening 74 into the manifold 75 surrounding the screw housing 61, and exits through the pipe stub 76. The manifold 75 has an end plate 77 with a bearing 78 around its circumference. The treating drum 2 rotates around this bearing 78 at an angular velocity of $\omega_1$. The opening 74 is arranged in the upper part of end plate 77, its lower part—beneath the screw housing 61 is of solid material. The condensate precipitating from the manifold 75 can be discharged through drain pipe 79.

Also the embodiment according to FIG. 6 features an outlet pipe 80 in the hollow shaft 13, leading through and extending beyond the treating drum 2, to the end of which the pipe 81 is connected. This latter pipe corresponds to the discharge pipe 43 illustrated in FIG. 1. Accordingly, it serves to discharge the medium passing through the enclosed spaces 38, 37, 36, 35, 63 used for external heating or cooling. Thus this medium is discharged via pipe 80 and discharge pipe 82. In this embodiment, the hollow shaft 13 actuated by the drive 17 serves to rotate the mixer blades 16 at an angular velocity of $\omega_2$, while the pipe 80 is fixed to the end plate 8 of the treating drum 2 and rotates together with it at an angular velocity of $\omega_1$.

Figure 7:
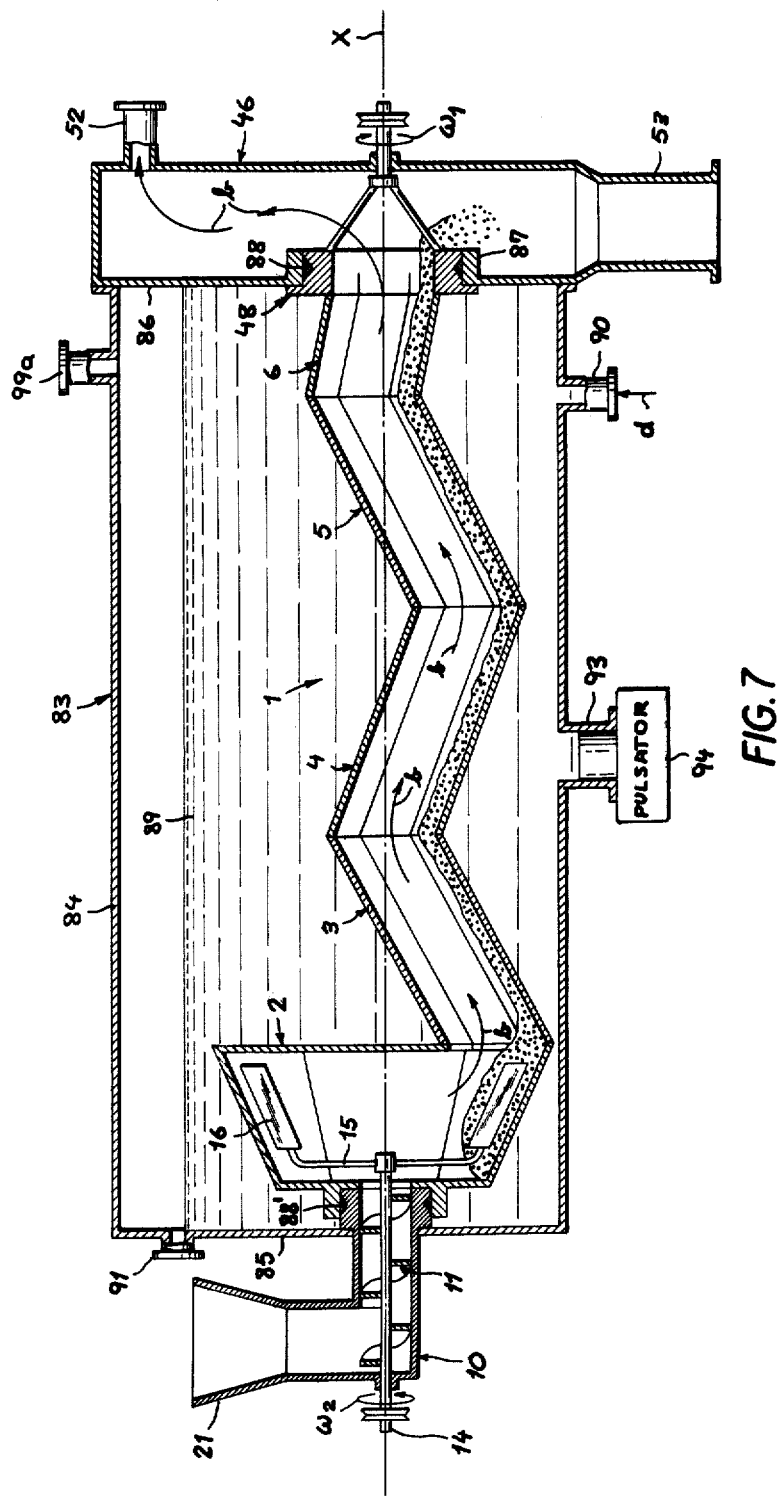
FIG. 7 is a diagrammatic axial sectional view of the apparatus according to a further embodiment of the invention.

The embodiment of FIG. 7 differs from the others in its cooling method. In this embodiment the treating body 1 is not jacketed but placed in the horizontally arranged cylindrical tank 83 through which the coolant flows, the treating body 1 being immersed in this coolant. The tank 83 is formed by a cylindrical body 84 with vertically arranged flat end plates 85, 86. The cylindrical screw housing 61 is rigidly fixed to the front end plate 85, while a unit consisting of bearing 87 and stuffing box 88 is at the rear end plate 86, in which unit the ring 48 (see also FIG. 1) is rotatably embedded. With its end plate 7, the treating drum 2 is connected to the stationary screw housing 61 through a similar bearing-stuffing box unit 88'. The bearings ensure the rotation of treating body 1, the stuffing box prevents the coolant 89 from escaping from the tank 84. Coolant 89 is fed into the tank 83, in the direction indicated by the arrow d through the pipe stub 90 leading into the tank 83. The pipe stub 91 serves for the discharge of the heated coolant by overflow.

To increase the efficiency of cooling, a pulsator 94 is provided in pipe stub 93 leading into the lower central part of tank 83, the pulsator being actuated by a drive (not shown) providing an alternating movement and imparting to the coolant such motion. The stroke and amplitude of the pulsator are adjustable. In other respects, the apparatus is identical with that of FIG. 1, however for the sake of simplicity the cell feeders are not illustrated.

Figure 8:
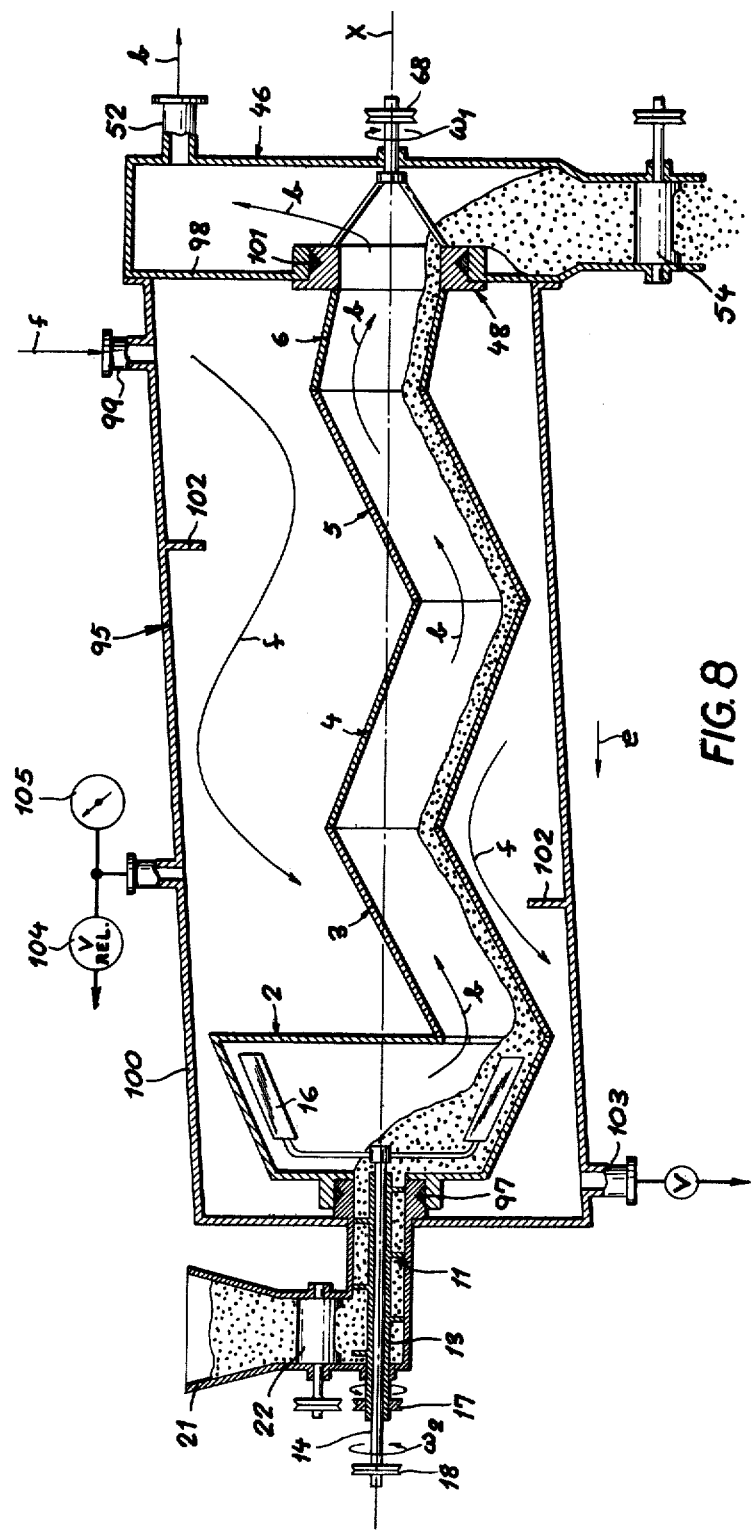
FIG. 8 is a diagrammatic axial sectional view of the apparatus according to a still further embodiment of the invention.

The embodiment of the invention shown in FIG. 8 is similar to that shown in FIG. 7 with the difference being that the treating body 1—not jacketed in this case either—is accomodated in a steam tank and not in a coolant tank. This apparatus has a closed horizontally arranged cylindrical tank 95 sloping toward the treating drum 2 in the direction of arrow e. The cylindrical screw housing 61 is rigidly fixed to the end plate 96 of the cylinder 95, to which the treating drum 2 is rotatably and airtightly connected through the bearing-stuffing box unit 97. There is a ring- and stuffing box unit 101 also in the other end plate 98 of the tank 95, to support the ring 48 and to prevent the steam from escaping. The steam is admitted through pipe stub 99 into the top of tank 95, in which gas flows in the direction of arrows f. Baffle plates 102 extend inwardly from the cylindrical wall 100 in order to force the steam into a path optimal for heat exchange with the treating body 1. In the lowermost point of the tank 95, a pipe stub 103 extends downwardly from the tank to discharge the condensate. The tank 95 is fitted with a pressure limiter 104 and manometer 105. In other respects the embodiment shown in FIG. 8 is generally identical with that of FIG. 1. The identical structural elements are marked with the same reference numbers.

The invention is naturally not restricted to the above detailed embodiments, but within the scope of the invention, it can be practiced in several alternatives. For example the rotating mixer blades 16 which figure in each embodiment, may be omitted and in that case the treating drum 2 may have a polygonal shape to encourage the mixing of the materials.

What we claim is:

1. An apparatus for treatment of wet solids, especially pulpy organic materials comprising:
   a hollow treating body rotatable about a horizontal axis;
   means for feeding the material to be treated into said treating body;
   means for discharging the treated material from said treating body; and
   means for controlling the temperature of said treating body, said treating body comprising:
   a treating drum centered on said horizontal axis and communicating thereat with said feeding means, said drum having a polygonal cross section defined by an axially flared peripheral wall formed by a plurality of planar panels, each having a pair of nonparallel opposing edges, said peripheral wall being flanked by first and second polygonal end walls of different size centered on said horizontal axis and perpendicular thereto, said first and second end walls being connected at corresponding edges to said peripheral wall,
   a first duct having a polygonal cross section communicating with said drum at a location wholly offset from said horizontal axis and having a first longitudinal axis forming an angle therewith,
   a second duct having a polygonal cross section communicating with said first duct at said horizontal axis and having a secong longitudinal axis forming an angle therewith, said first and second longitudinal axes intersecting on said horizontal axis, a third duct having a polygonal cross section communicating with said second duct at a location wholly offset from said horizontal axis and having a third longitudinal axis forming an angle therewith, and a fourth duct having a polygonal cross section communicating with said third duct at said horizontal axis and having a fourth longitudinal axis forming an angle therewith, said third and fourth longitudinal axes intersecting at a location offset from said horizontal axis, said fourth duct having an outlet centered on said horizontal axis and communicating with the discharge means, said first, second, third and fourth ducts having substantially the same cross sectional area.

2. The apparatus defined in claim 1 wherein said means for controlling the temperature of said treating body comprises jackets formed on said first, second, third and fourth ducts and on said drum, said jackets being interconnected and an inlet pipe provided on at least one jacket and an outlet pipe provided on at least one jacket for passing a temperature-controlled fluid therethrough.

3. The apparatus defined in claim 2 including a first inlet pipe provided on at least one of said jackets on said first, second, third and fourth ducts and a second inlet pipe provided on said jacket on said drum, said outlet pipe being connected to at least one of said jackets on said ducts and to said jacket on said drum for a temperature-controlled fluid to be passed through the jackets on said first, second, third and fourth ducts independently of a temperature-controlled fluid passed through the jacket on said drum.

4. The apparatus defined in claim 1 wherein said means for controlling the temperature of said treating body comprises a tank containing a temperature-controlled fluid and said treating body is positioned in said tank and immersed in said fluid.

5. The apparatus defined in claim 1, claim 2, claim 4 or claim 3 wherein said feeding means comprises a screw conveyor in axial alignment with said drum, said screw conveyor having a housing formed with an upright hopper provided with an airtight cell feeder positioned therein.

6. The apparatus defined in claim 5 wherein said discharge means comprises an elongated upright housing formed with a discharge chute at the lower end thereof below said outlet of said fourth duct, said discharge chute being provided with an airtight cell feeder positioned therein.

7. The apparatus defined in claim 6, further comprising a pipe stub formed at the upper end of said elongated upright housing and connected to a vacuum source for creating a vacuum within said treating body.

8. The apparatus defined in claim 7, further comprising a plurality of rotatable mixing blades disposed within said treating drum adjacent the peripheral wall thereof.

9. The apparatus defined in claim 8, wherein said blades are mounted on an independent drive to rotate in a direction counter to the rotation of said treating body and at a different angular velocity therefrom.

10. The apparatus defined in claim 1 wherein said means for controlling the temperature of said treating body includes a blower feeding through a heat exchanger into said discharge means for passing a temperature-controlled gas through the interior of said treating body in a countercurrent flow to the material being treated.

* * * * *